Sept. 7, 1948.  P. GLASS  2,448,793
RECTIFIER FED MOTOR SYSTEM
Filed Aug. 17, 1943

Inventor
Paul Glass
By Ralph B. Stewart
Attorney

Patented Sept. 7, 1948

2,448,793

UNITED STATES PATENT OFFICE 2,448,793

RECTIFIER FED MOTOR SYSTEM

Paul Glass, Chicago, Ill., assignor to Askania Regulator Company, a corporation of Illinois Application August 17, 1943, Serial No. 498,998

6 Claims. (Cl. 318—257)

1

This invention relates to control circuits for regulating or controlling the speed of a power motor in response to a signal of variable amplitude supplied to the control circuit.

According to the preferred form of my invention, the direction of rotation of the power motor is controlled in accordance with the polarity or sense of the signal, and the speed of the motor is controlled in accordance with the amplitude of the signal.

The power motor is energized from a source of alternating current, and the amount of power supplied to the motor is controlled by a vacuum tube of the gaseous discharge type which in turn is controlled by the input signal of variable amplitude introduced into its grid circuit. An alternating current biasing potential is supplied to the grid circuit from the A. C. source and has a phase displacement of substantially 180° with respect to the anode voltage and an amplitude greatly in excess of the value required to prevent firing of the tube in the absence of a signal. Where the signal is an alternating current signal, it has the same frequency as the A. C. source and preferably has a phase angle leading the anode voltage by substantially 90°. A D. C. biasing voltage which varies in magnitude in accordance with the speed of the motor is supplied to the input circuit in a direction tending to prevent firing of the tube.

Where the motor operates in only one direction in accordance with variations in amplitude of a signal, only one control tube is required, but where the motor is to operate in opposite directions in response to variations in polarity or sense of the signal, two control tubes are required, one for each direction of operation.

Various forms of my control circuits are shown in the accompanying drawing in which.

Figure 1:
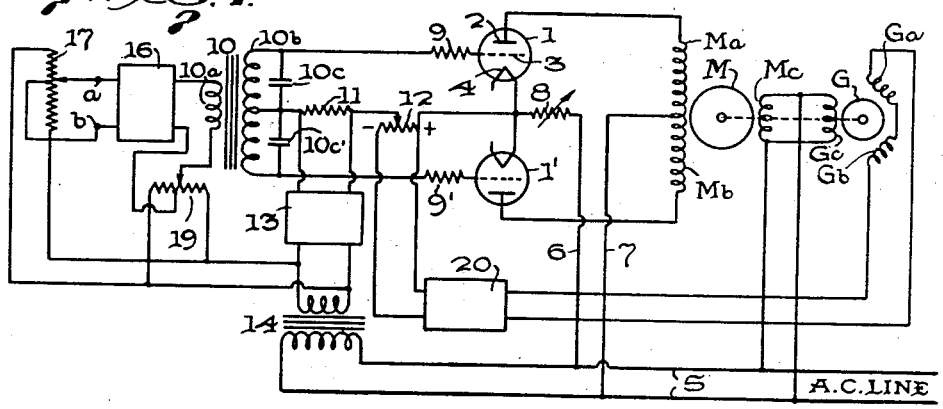
Figure 1 illustrates one form of my invention for operation in response to alternating current signals.

Referring to Figure 1 the variable speed power motor to be controlled is shown at M. This motor is diagrammatically represented as being a shaded pole motor having shaded pole windings Ma and Mb and a field winding Mc, but the motor may be of other types as explained below. The control circuit involves two electron tubes I and I' of the gaseous discharge type, each embodying a plate 2, a grid 3 and a cathode 4. The plate circuit of tube I is connected to supply current to shaded pole winding Ma from an alternating current circuit 5 through connections 6 and 7, including a current limiting resistance 8. In a like manner, the plate circuit of tube I' is connected to supply current to shaded pole winding Mb through connections 6 and 7 and resistance 8. Thus supply voltages of the same phase are supplied to the anodes of tubes I and I' from supply circuit 5. The field winding Mc is connected directly to supply circuit 5. The grid circuit of tube I includes in series resistance 9, one-half of the secondary winding 10b of input transformer 10, resistance 11, and potentiometer 12. Likewise the grid circuit of tube I' includes in series resistance 9', the other half of the secondary winding 10b of input transformer 10, resistance 11, and potentiometer 12. Condensers 10c and 10c' are shunted across the halves of secondary 10b to prevent high frequency disturbances from affecting the operation of the tubes.

An alternating current biasing potential of adjustable amplitude and phase is supplied across the terminals of resistance 11 through phase shifter 13 which is supplied from transformer 14 connected to supply circuit 5. Phase shifter 13 is adjusted so that the A. C. biasing voltage leads the anode voltage of tubes I and I' by an angle somewhat less than 180°. The function of phase shifter 13 is to overcome the "dead zone" of tubes I and I' by shifting the phase of the biasing potential to a value such that a very small signal voltage supplied to the primary 10a of input transformer 10 will cause one or the other of the tubes to fire.

The input signals are supplied to transformer 10 through a phase shifter 16 which shifts the phase of the signal to lead the anode voltage of tubes I and I' by substantially 90°. The input signals may be derived from any source which is to control the operation of the motor. The signals should have the same frequency as the frequency of supply circuit 5. One suitable arrangement is shown in Figure 1 involving a center tap potentiometer 17 supplied from circuit 5 through transformer 14. Shifting the contact on the potentiometer 17 to opposite sides of the center tap will impress A. C. signal voltages of opposite phase and variable amplitude across the terminals of phase shifter 16.

A center tapped equalizing potentiometer 19 is connected in the input circuit and is supplied from the supply circuit 5 from the secondary of transformer 14. The equalizer may be connected in the input circuit in front of phase shifter 13 if desired.

The function of equalizer 19 is to supply additional A. C. biasing voltages to the grids of tubes 1 and 1' in order to equalize the operation of these two tubes, that is, in order to condition these two tubes for firing at the same signal values. The two equalizing voltages are opposite in phase and serve to shift in opposite directions the phase angle of the resultant A. C. grid biasing voltages of tubes 1 and 1'. This feature of my invention is being claimed in my copending application Serial No. 489,207, filed May 31, 1943. The equalizing potentiometer is a refinement which is not essential and may be omitted where it is not essential that both tubes fire at the same signal value.

The speed responsive device for generating a variable biasing voltage to be introduced into the input circuit may assume different forms. In Figure 1 it is shown as a pilot generator G diagrammatically represented as a structure of the same type as the motor M, that is, a shaded pole dynamo having two shaded pole windings $Ga$ and $Gb$ and a field winding $Gc$. Windings $Ga$ and $Gb$ are connected in series opposition to a rectifier and filter 20 which supplies direct current to potentiometer 12.

Figure 1A:
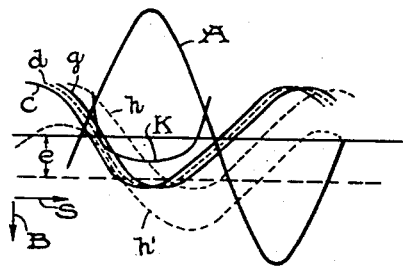
Figure 1a is a wave diagram illustrating the operation of Figure 1.

The operation of Figure 1 may be explained by reference to Figure 1a. Curve A represents the anode voltages of tubes 1 and 1'. Curve $c$ represents the resultant A. C. biasing voltage supplied to one of the two grids through phase shifter 13 and from the equalizer 19. As will be seen, curve $c$ leads curve A by slightly less than 180°. The dotted curve $d$ indicates the critical position of the A. C. biasing voltage which just touches the characteristic curve $k$ and causes firing of the tube. Curve $d$ is slightly retarded in phase with respect to curve $c$. Since the signal voltages are added to the A. C. biasing voltages at 90° phase displacement, the signal voltage will cause the resultant grid voltage of one tube to be retarded in phase and will cause firing of that tube, while the other grid voltage will be advanced in phase and will prevent firing of the second tube. For example, an input signal which causes the curve $c$ to shift beyond the curve $d$ in the direction of the arrow S to the position $g$ will cause the associated tube to fire at the beginning of each positive half-cycle of the anode voltage A. This will cause the motor M to operate in one direction. When the motor is stationary, voltages of equal amplitude and opposite phases are induced in shaded pole windings $Ga$ and $Gb$ of the pilot generator, and no biasing voltage is applied to the input circuit from rectifier 20. As the motor M speeds up, the reaction of the currents set up in the rotating squirrel-cage armature of generator G causes an unbalance of the voltages induced in windings $Ga$ and $Gb$, and the resultant voltage applied to rectifier 20 produces a D. C. voltage at 12 proportional to the speed of the generator. The frequency of the voltage of G is always equal to the frequency of the supply circuit 5. Since the D. C. biasing voltage supplied to the input circuit from rectifier 20 tends to bias the grids negatively, it tends to shift the axis of the grid voltage wave downwardly as indicated by the arrow B in Figure 1a and thus tends to prevent firing of the tube. When the D. C. biasing voltage increases to the value $c$ where the A. C. grid wave now at $h'$ does not intersect curve $k$, the tube stops firing and the motor begins to slow down. As a consequence, the D. C. biasing voltage is reduced and the grid voltage curve now moves upwardly until the tube fires again. Thus, the grid voltage curve oscillates up and down about the critical position $d$. The frequency of oscillation and the ratio of on time to the period of oscillation adjust themselves such that a definite average motor speed is established for a given input signal. It will be noted that whenever a tube fires, it becomes conductive at the beginning of the anode voltage positive pulse and current flows throughout the positive half-cycle of the anode pulse. The speed of the motor M to be maintained in response to any given signal value may be adjusted by adjusting the variable contact on potentiometer 12.

If the sense or phase of the signal is reversed, the tube which formerly was inactive will now become active and the motor will operate in the reverse direction. Reversal of the direction of rotation of generator G will also reverse the phase of the voltage supplied to rectifier 20 but the polarity of the D. C. biasing voltage introduced into the input circuit at potentiometer 12 remains the same, so the regulating action previously explained takes place in the same manner to limit the speed of the motor in accordance with the amplitude of the input signal.

Figure 2A:
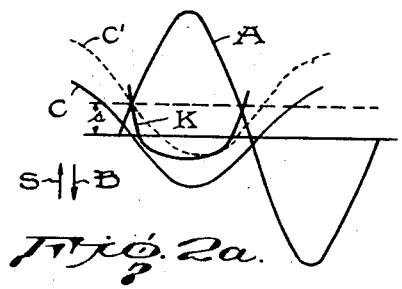
Figure 2a is a wave diagram illustrating the operation of Figure 2.
Figure 2:
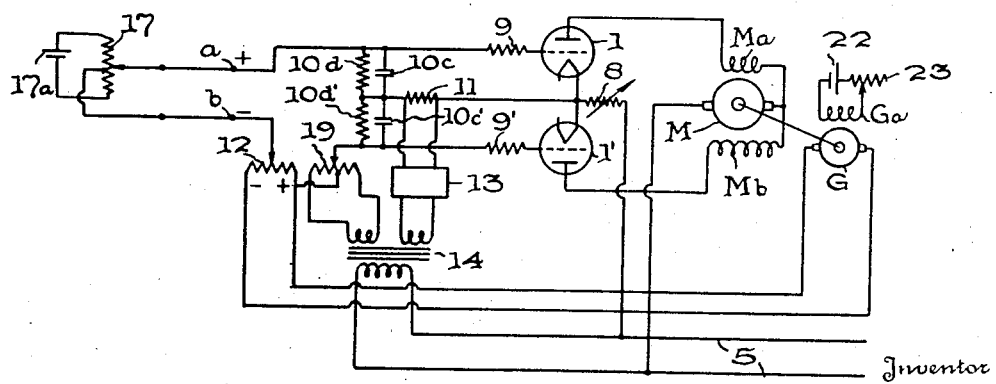
Figure 2 is a diagram showing another form of my control circuit for operation in response to direct current signals.

In Figure 2 I have shown a modified control circuit for operation in response to direct current signals and in which the speed responsive device generates a direct current biasing potential which reverses in polarity with reversal in direction of operation of the power motor. Elements having functions corresponding to similar elements in Figure 1 are represented by like reference characters.

The motor M in Figure 2 is shown as a split field series motor having field windings $Ma$ and $Mb$ for operation in reverse directions, but any other suitable motor may be employed such as the shaded pole motor shown in Figure 1. The A. C. biasing potential for normally preventing firing of the tubes is supplied to the grids of both tubes from phase shifter 13 to a common portion of the grid circuit and through resistances $10c$ and $10c'$ to the grids. The direct current signals are supplied from any suitable source represented by potentiometer 17 and battery 17a connected to the input terminals $a$ and $b$. The input circuit is completed through a part of potentiometer 12, through equalizer 19 and through resistance elements $10d$ and $10d'$ in series. The speed responsive device for generating the variable D. C. biasing voltage is represented as a direct current pilot generator G driven from the motor M and having a field winding $Ga$ energized from a suitable source represented by the battery 22. The excitation may be varied by means of variable resistance 23. The pilot generator G supplies a direct current voltage of variable magnitude to potentiometer 12, and the polarity of the voltage introduced in the input circuit by the potentiometer 12 is opposite to the polarity of the applied signal.

Operation of Figure 2 is as follows: The A. C. biasing voltage supplied through phase shifter 13 is adjusted to normally prevent firing of both tubes in the absence of an applied signal, and equalizer 19 is adjusted so that both tubes will fire for the same value of applied signal. Under these conditions the phase relation between the anode voltage wave A and the grid biasing wave $c$ of the two tubes is shown in Figure 2a. Assume now that a signal is applied to the input circuit so that terminal $a$ becomes positive and terminal $b$ becomes negative. The effect on tube 1 will be to shift the axis of the grid wave $c$ upwardly by a distance $s$ (see Figure 2a) equal to the value of the signal applied to the grid of the tube. This shifts the grid voltage wave to the position $c'$ where it now intersects the curve $k$ at the beginning of the positive anode pulse, and tube 1 fires during each positive anode pulse.

The motor M begins to rotate and the generator G applies a D. C. biasing voltage to potentiometer 12, and a portion of this voltage is introduced into the input circuit in opposition to the applied signal. This counterbalancing voltage tends to shift the axis of the grid voltage wave back towards its normal position, and when the motor speed reaches a value such that the counterbalancing voltage is equal to the applied signal voltage, the grid voltage wave has been shifted back to its original position $c$, and the tube stops firing. As the motor M slows down, the counterbalancing voltage also decreases, and if the applied signal is still present, the grid voltage wave $c$ moves upwardly and causes the tube to begin firing again. Thus, the signal voltage tends to shift the grid voltage wave upwardly as shown by the arrow S in Figure 2a, while the voltage of the pilot generator G tends to shift the grid wave downwardly as shown by the arrow B in Figure 2a. The action is such that the grid voltage wave $c$ oscillates up and down in a narrow range to cause periodic firing of the tube 1 and to maintain the motor M at a definite speed for a given value of signal. The particular speed of the motor M for any given signal value may be adjusted by adjustment of either potentiometer 12 or field resistance 23.

In case the polarity of the applied signal is reversed, tube 1' will become operative and the motor M will operate in the reverse direction. The reverse operation of pilot generator G will also reverse the polarity of the D. C. biasing or counterbalancing voltage supplied to potentiometer 12, and the operation will be the same as described above.

Where the applied signal is an alternating current voltage as in the case of Figure 1, I prefer to apply the signal voltage with a phase relation which leads the anode voltage by substantially 90°, but this exact phase relation is not essential, and other phase angles may be employed. It is only necessary that the applied signal has a phase relation which tends to cause firing of one of the tubes and prevents firing of the other tube. Also, while I have shown two types of power motors which may be used, other known types of motors may be employed.

In the appended claims, the term "alternating current generator" is to be interpreted broadly to apply to any known type of device which will supply an alternating current of a magnitude which varies with the speed of the device. While I have shown one specific example in Figure 1, other known arrangements may be used. In my copending application Serial No. 489,208, now Patent No. 2,417,868, dated March 25, 1947, I have shown a number of speed responsive devices which would be suitable for supplying alternating current to rectifier 20 in Figure 1 of the present application.

I claim:

1. A speed control circuit comprising, in combination, a motor, a source of alternating current, a gaseous discharge tube having an anode circuit and a grid circuit, said anode circuit being connected to supply current to said motor from said source, means for supplying a biasing voltage to said grid circuit from said source substantially opposite in phase to the anode voltage of said tube and having a value sufficient to prevent firing of said tube in the absence of a signal, means for supplying to said grid circuit an alternating current signal voltage leading the anode voltage by substantially 90° to cause firing of said tube, and speed responsive means driven by said motor for applying to said grid circuit a direct current biasing voltage to negatively bias the grid of said tube by an amount which varies directly with the speed of said motor.

2. A speed control circuit comprising, in combination, a motor, a source of alternating current, a pair of gaseous discharge tubes each having an anode circuit and a grid circuit, the anode circuit of one tube being connected to supply current from said source to said motor for operation in one direction and the anode circuit of the other tube supplying current from said source to said motor for operation in the reverse direction, the anode voltages of said tubes being of substantially the same phase, means for supplying from said source to both grid circuits a biasing voltage substantially opposite in phase to said anode voltages and of an amplitude sufficient to prevent firing of said tubes in the absence of a signal, means for supplying to said grid circuits signal voltages of opposite sense tending to cause firing of one of said tubes and prevent firing of the other, and speed responsive means driven by said motor for applying to said grid circuits direct current biasing voltages which vary in amplitude directly with the speed of said motor, the direct current biasing voltage applied to the grid of the operating tube being applied to bias the grid negatively and tends to prevent firing of said tube.

3. A speed control circuit according to claim 2 wherein the grid circuits of said pair of tubes are connected in push-pull relation with a source of alternating current to provide signal voltages which respectively lead and lag the anode voltages by substantially 90°, and wherein said speed responsive means includes an alternating current generator driven by said motor, a rectifier for rectifying the current from said generator, and a connection from the rectifier for supplying a variable direct current voltage to the common portion of said grid circuits.

4. A speed control circuit according to claim 2 wherein the grid circuits of said pair of tubes are connected in push-pull relation to an input circuit including a source of direct current signal voltage, and wherein said speed responsive means includes a direct current generator driven by said motor and being reversible in polarity with reversal in direction of operation of said motor, said generator being connected to supply a counterbalancing voltage of variable magnitude to said input circuit in opposition to said signal voltage.

5. A speed control circuit comprising, in combination, a reversible motor, a source of alternating current, a pair of gaseous discharge tubes each having an anode, a cathode and a grid, an anode circuit for one tube connected to supply current from said source to said motor for operation in one direction, an anode circuit for the other tube for supplying current from said source to said motor for operation in the reverse direction, the anode voltages of said tubes being of substantially the same phase, grid circuits for said tubes having a common portion and including means for impressing signal potentials of opposite polarity upon the grids of said tubes, an alternating current generator driven by said motor, a rectifier supplied by said generator, and connections from said rectifier to said common portion of said grid circuits for impressing a negative potential upon the grid elements of both of said tubes and having a value which varies directly with the speed of said motor.

6. A speed control circuit comprising, in combination, a reversible motor, a source of alternating current, a pair of gaseous discharge tubes each having an anode, a cathode and a grid, an anode circuit for one of said tubes connecting said motor to said source for operation in one direction, an anode circuit for the other tube connecting said motor to said source for operation in the reverse direction, the anode voltages of said tubes being of substantially the same phase, a signal source comprising a reversible direct current potential, coupling means for coupling said signal source to the grids of said tubes in push-pull relation, a separately excited direct current generator connected in series with said signal source and said coupling means and in opposing relation to said signal source, and means for driving said generator from said motor.

PAUL GLASS.

REFERENCES CITED

The following references are of record in the file of this patent:

UNITED STATES PATENTS

| Number | Name | Date |
| --- | --- | --- |
| 1,944,756 | Quarles | Jan. 23, 1934 |
| 2,068,490 | Hull | Jan. 19, 1937 |
| 2,179,569 | Young | Nov. 14, 1939 |
| 2,229,448 | Garman | Jan. 21, 1941 |

Certificate of Correction

Patent No. 2,448,793.  September 7, 1948.

PAUL GLASS

It is hereby certified that error appears in the printed specification of the above numbered patent requiring correction as follows: Column 3, line 75, for "value *c*" read *value e*; and that the said Letters Patent should be read with this correction therein that the same may conform to the record of the case in the Patent Office.

Signed and sealed this 30th day of November, A. D. 1948.

[SEAL]

THOMAS F. MURPHY,
*Assistant Commissioner of Patents.*